March 8, 1927.　　　F. W. BAKER　　　1,619,802

VEHICLE WHEEL

Filed Sept. 23, 1925

INVENTOR.
Frederick W. Baker,
BY
Ramsay Hoguet.
ATTORNEY

Patented Mar. 8, 1927.

1,619,802

UNITED STATES PATENT OFFICE.

FREDERICK W. BAKER, OF STOURBRIDGE, ENGLAND, ASSIGNOR TO TRINITY WHEEL CORPORATION, A CORPORATION OF NEW YORK.

VEHICLE WHEEL.

Application filed September 23, 1925. Serial No. 58,134.

My invention relates to improvements in vehicle wheels, and more particularly wheels for automobiles of the class shown in my application for Letters Patent of the United States, filed February 2, 1920, Serial Number 355,631, and in my Letters Patent of the United States, No. 1,524,806, dated February 3, 1925.

In the aforesaid application and Letters Patent I have shown the advantage of a three-point suspension spoke system, in which the outer rim or rims can be supported in such a way as to utilize the natural resilience of the rim or rims without serious deformation, and in which unusual strength is obtained.

My present improvement relates to a more detailed means of carrying out the ideas disclosed in my prior inventions above referred to, and is intended to produce an exceedingly strong and simple structure which can be easily and inexpensively made and which has the desirable qualities of strength both laterally and radially of the disc wheel and also the advantage of easy cleaning, and which at the same time is a structure in which the utmost resilience, strength and also beauty of contour are obtained.

My invention also is intended to show a strong, simple and improved structure on the lines indicated, which can be used either with demountable rims and a tire or in the form of a rim which is demountable at the axle or hub, and in the drawings I have illustrated this latter type.

Reference is to be had to the accompanying drawings forming a part of this specification, in which similar reference characters indicate corresponding parts in all the views.

Figure 1:
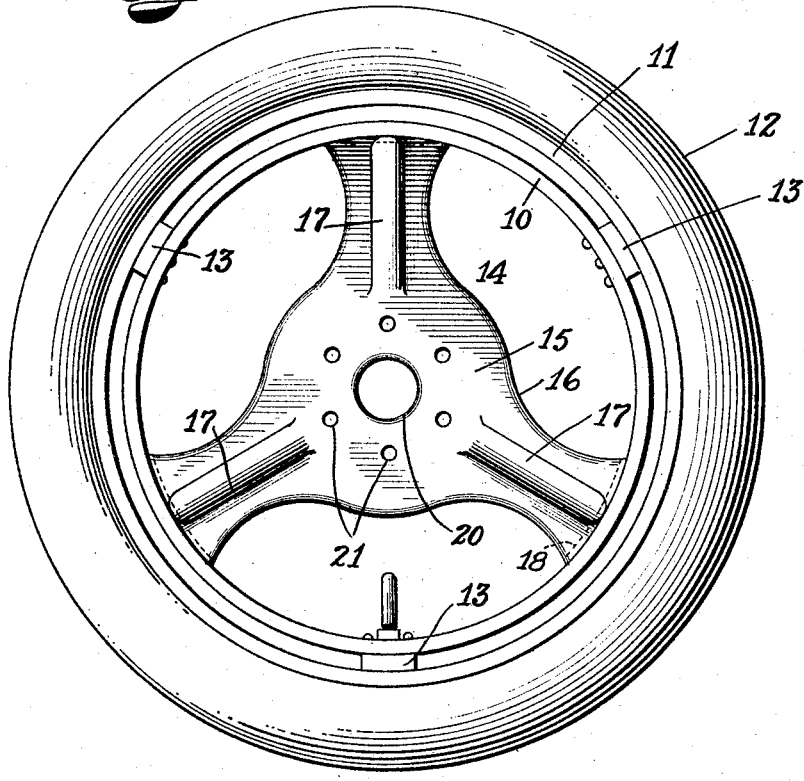
Figure 1 is a side elevation of the wheel embodying my invention.
Figure 2:
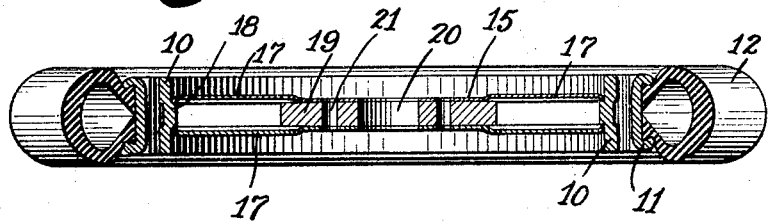
Figure 2 is a cross section thereof.

As shown, the wheel comprises an inner rim 10 and an outer rim 11 spaced apart therefrom and concentric therewith, the outer rim carrying the tire 12 in the usual or preferred way. The inner and outer rims are separated by bearing blocks 13 which are shown merely in a diagrammatic manner, and which may be of any usual or preferred construction, so that the inner and outer rims are detachable or not, as desired.

It will be noticed that by placing these bearing blocks at equidistant places the outer rim is left so that its natural resilience is utilized, and the wheel is not capable of any serious deformation, as the strain or load when applied to any particular sector will be limited to that sector by the bearing blocks 13, and as a matter of fact the deformation will be theoretical rather than real because of the distribution of strain to which I shall presently refer.

The spoke system is of the general kind referred to in my prior application and patent, that is to say, the spoke system 14 is made up of three regularly spaced arms and these are formed of stampings 15 which are exactly similar, and which are preferably curved as shown at 16 and have their meeting edges welded firmly together. The arms of this spoke system merge into a substantial central body portion, giving great strength and preserving the arch effect referred to in my prior application and patent, and the arms are greatly stiffened by ribs 17 which are preferably radial and which are stamped thereon. The stampings 15, while they may be placed face to face, that is to touch or contact throughout, are preferably spaced somewhat to give greater lateral strength, and they can be connected to the inner rim 10 in any suitable or preferred way but preferably the inner rim is provided with inwardly extending bosses 18 against the sides of which the arms or stampings 15 fit and the meeting parts are preferably secured by welding. The inner or hub portions of the stampings are spaced apart by a block 19, which also serves as a brace and gives the necessary strength to the hub portions. The block can be secured in any convenient way, and it is bored through at the center to make an axle hole 20 common to the block and the stampings 15, and both stampings and block are also bored through as at 21 to facilitate attachment to the hub flanges of the axle.

It will therefore be noted that the wheel is demountable at the hub, but if it were provided with a hub of any approved form it would not affect the invention. This type of wheel, however, lends itself better to the structure in which the wheel is demountable at the hub.

It will be noted that in the type of wheel shown and described I preserve all the valuable features illustrated in my prior application and patent, and that the arms of the spoke system connect rigidly with the inner rim 10 at points midway between the blocks 13 so that the resilience of the inner rim as well as the outer is preserved, and the deformation and strain limited between two arm portions of the spoke system which it will be noted is in the form of a three-arm spider. Therefore, not only is the wheel resilient and strong, but the bearing blocks 13 permit a certain resilience in the outer rim and the spoke system permits natural resilience of the inner rim, but further, as the arms of the three-arm spider and the bearing blocks 13 are symmetrically spaced, I get the double result of resilience and strength and the distribution of strain between the arms of the spokes and the bearing blocks 13 which obviates serious shock. Any tendency of the outer rim to flatten is limited to a sector between the bearers 13; any tendency of the inner rim to flatten is limited to a sector between two of the spider arms; and all shocks and strains are by reason of the three armed spider construction of the spoke system distributed to all arms of the spiders and absorbed by the system as a whole thus reducing the transmitted shock and rendering distortion at any one point unlikely. The wheel thus shown is very simple and inexpensive to make, it is enormously strong, easily cleaned and naturally very resilient.

I claim:

1. A vehicle wheel comprising a rim and a spoke system composed of a three arm spider formed of opposed stampings secured to the rim at the ends of the arms and fastened together at their meeting portions, and a spacing block between the stampings at the hub portion thereof.

2. A vehicle wheel having a rim and a spoke system comprising a spider formed of opposed stampings with the ends of the spider arms secured to the rim and the meeting portions of the stampings fastened together, and a spacing block between the stampings at their hub portions.

3. A vehicle wheel having a rim and a spoke system comprising a three-arm spider formed of opposed stampings spaced apart at their middle portions and fastened together at their meeting edges and connected to the rim at equidistant points thereon, and a spacing block between the stampings at the center thereof.

4. A vehicle wheel having a rim with bosses on the inner wall and a spoke system comprising a three-arm spider formed of opposed stampings fastened together at the edges and with the arms fitting over and secured to the adjacent rim bosses.

5. A vehicle wheel having a rim and a spoke system comprising a three-arm spider formed of opposed stampings fastened together at the edges and connected to the rim at equidistant points thereon, and a block between the stampings at the central part thereof, the block and stampings having holes therethrough to facilitate attachment to the hub flanges.

In testimony whereof, I have signed my name to this specification this 12th day of August, 1925.

FREDERICK W. BAKER.